Patented Oct. 10, 1933

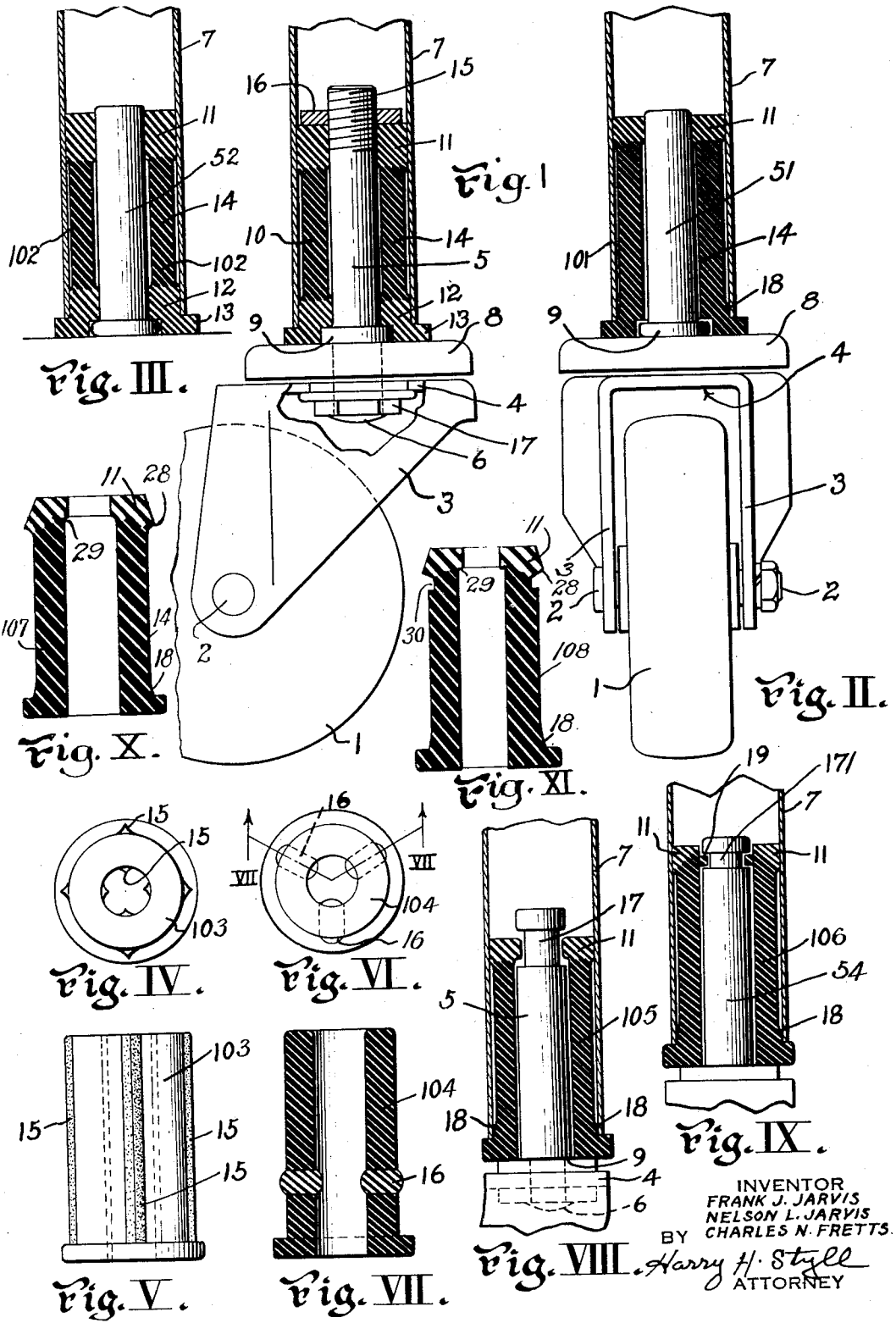

1,929,743

UNITED STATES PATENT OFFICE 1,929,743

CASTER AND THE LIKE

Frank J. Jarvis and Nelson L. Jarvis, Palmer, and Charles N. Fretts, West Springfield, Mass., assignors to Jarvis & Jarvis, Inc., Palmer, Mass., a corporation of Massachusetts Application August 1, 1932. Serial No. 627,188

5 Claims. (Cl. 16—43)

This invention relates to improvements in casters and the like and has particular reference to improved expanding means for uniting the stems and sockets of such devices and to an improved process for producing such devices and uniting such parts.

One of the principal objects of the invention is to provide improved expanding means for securing the stem in a holding socket.

Another object of the invention is to provide improved means for resiliently securing the stem in a socket so that the stem may be rotatable therein.

Another object of the invention is to provide improved means for resiliently holding the stem in the socket so that the caster fork or bracket may be rotated with respect to the socket member.

Another object of the invention is to provide an improved socket member adapted to resiliently hold itself in place in the socket and also to resiliently hold the stem in position in the socket through the inherent properties of the material from which the said member is constructed.

Another object of the invention is to provide improved means for holding the stem in the socket that will require less working parts than such devices previously used, that will be less expensive to produce, and that will require less time and labor to assemble and put in place.

Another object of the invention is to provide an improved process for making such socket members.

Another object of the invention is to provide such an improved socket member having parts of different degrees of resiliency to provide resilient parts where resiliency is required and strength where strength is required.

Other objects and advantages of the invention will become apparent from the following description taken in conjunction with the accompanying drawing. It will be apparent that many changes may be made in the arrangement of parts, the details of construction and the steps of the process without departing from the spirit of the invention as expressed in the accompanying claims. We do not, then, desire to be limited to these exact details shown and described, as the preferred forms are shown and described by way of illustration only.

Referring to the drawing:

Fig. I is an elevation partially in cross section showing one form of the invention applied to a caster.

Fig. II is a side view of Fig. I, but showing a modified form of socket member.

Fig. III is a partial longitudinal section showing a modified form.

Fig. IV is a top view of another form of socket member.

Fig. V is an elevation of Fig. IV.

Fig. VI is a top view of another form of socket member.

Fig. VII is a longitudinal section on line VII—VII of Fig. VI.

Fig. VIII is a longitudinal section of another modification.

Fig. IX is a longitudinal section of another form, and

Figs. X and XI are longitudinal sections of other forms.

Prior to this invention it has been customary to hold the stem in place in the socket either by direct mechanical devices, or by resilient members operated by mechanical devices. These mechanical devices have many objectionable features and disadvantages that have brought them into disfavor. They are expensive to make and to assemble, they are difficult to assemble, the parts become loose and inoperative, they transmit shocks, they are noisy, they are heavy, and in general very unsatisfactory for the purposes to which they are put. It is, therefore, one of the prime objects of this invention to overcome these objections and to provide an improvement at less cost.

Referring to the drawing, wherein like reference characters denote similar parts throughout, the invention is shown applied to a caster comprising the wheel 1 pivoted at 2 between the arms 3 of the caster yoke 4; see Figs. I and II. Extending through the yoke 4 is the caster stem 5. This stem 5 may be secured to the yoke in any of the well known prior art methods. It may be riveted over at 6 as shown, or otherwise secured so that it will extend into the socket 7, which is a socket fitted to the article to which the caster is to be applied, and may be a metal tube, or a tube of other material. Over the yoke 4 and below the tube 7 is the support plate 8, positioned on the stem 5. The yoke 4 may be pivoted on the stem 5 by either a plain bearing or by a ball bearing, both being usual structures in the art. The yoke 4 may be rotatably secured to the stem or the stem may be non rotatably secured to the yoke. Where it is rotatably secured to the yoke the stem will not rotate in the socket. Where it is non rotatably secured to the yoke the stem will rotate in the socket. In this way the yoke is rotatable with respect to the socket. These are all usual structures and form no part of the invention. The stem is provided with shoulders 9 for holding it securely in place with respect to the yoke 4.

The stem 5 is held in place in the socket by the socket member or expander 10. In Fig. I the expander 10 comprises an annular plug member having an upper end 11 of relatively soft resilient material, such as soft rubber, a lower end 12 having a flange 13 extending under the end of the socket tube 7, also of relatively soft resilient material, and an intermediate body portion 14 of a relatively harder material, such as harder rubber, composition, fibre or the like, or it may be a rubber treated fabric such as is common in tires for automobiles, etc. In this construction the outer end 15 of the stem 5 is threaded and a nut 16 is threaded thereon over the end 11 of the expander. To assemble, the stem 5 is inserted in the hole in the expander, the nut 16 is placed on the end 15 of the stem but not screwed down tight on the expander. The expander is then inserted in the tube 7. Then the stem 5 is turned by the nut 17 with a wrench or spanner until the nut 16 is drawn down on the end 11 of the expander. This compresses the expander and the ends 11 and 12 thereof will engage the inner walls of the tube 7 to hold the parts together. The flange 13 extending under the ends of the tube 7 will prevent floor shocks being transmitted—an important factor where the caster is applied, as for example, to a hospital bed. The pin 5 will also be securely held in the expander. In this form the yoke 4 turns on the stem. The stem does not rotate in the tube or in the expander.

In making the expander many forms of plastic moulded compounds can be used, such as rubber, phenol resins, etc. An anti friction compound, such as graphite, may be incorporated for the surfaces around the hole in the expander.

In Fig. II the expander 101 does not have the relatively soft lower end 12, the lower end being of the same material as the body portion 14. The expander is held in place in the tube 7 by the soft end 11, which also holds the stem 5 in place. In this form the end 11 is made slightly larger than the tube and the hole in it slightly smaller than the stem 51.

In Fig. III the expander 102 has the soft ends 11 and 12 but there is no nut 16 used. The operation is the same as that of Fig. II, only contact is exerted at both ends 11 and 12.

In Figs. IV and V the expander 103 has a number of ridges or protrusions 15 running lengthwise both on the outside of the expander and on the inside of the hole therein to hold the stem in the expander and the expander in the tube. In this form the stem does not turn in the expander.

In Fig. VI and VII the expander 104 has a series of holes or slots moulded in the relatively hard material and filled with relatively soft plugs 16 to hold the expander in the tube and the stem in the expander. In this form the stem does not turn in the expander.

In Fig. VIII the stem 53 has the recessed portion 17. The expander 105 has the soft end 11 extending into this recess. It also has the taper 18 at the bottom to provide easy fit in the tube. The end 11 holds the expander in the tube 7, but the stem 53 is free to rotate in the expander.

In Fig. IX the expander 106 has the soft end 11 made in triangular form, leaving the relatively hard body next to the stem. The stem 54 has the recess 171 into which the projections 19 preferably of the same material as the part 106 extend. It also has the tapered lower end 18. The soft end 11 holds the expander in the tube 7, but the stem 5 is free to rotate in the expander.

In Fig. X the expander 107 has the relatively soft top 11 with the offset 28 at an angle and with the shoulder 29 on the inside. It has the tapered lower part 18. The soft part 11 is put on at an angle to the body 14.

In Fig. XI the expander 108 has the soft upper end 11, having the offset 28, the internal shoulder 29, the tapered lower part 18 and the groove 30. The groove 30 is to provide space for the soft part 11 to expand into.

The forms X and XI are provided to overcome the tendency of the expanders being very hard to insert into the tube 7, yet being once inserted are liable to fall out due to the effect of stretching or reducing in diameter easily when pulled outwardly. Both X and XI can be used either with the turning type stem or the non turning type stem and used in combination with the other types.

The construction employing the nut 16 of Fig. I can be used with the expander of the type shown in Fig. II, i. e., having the soft top 11 but not the soft bottom 12.

The tube 7 may be made in various sizes and shapes—round, hexagon, square, etc., and the expander made to fit.

Various combinations of methods of holding the stems and expanders can be used, as is apparent.

As described above, in some of the forms the stems are held tight in the expanders, the swiveling taking place in the casters, while in some the stems may swivel in the expanders and the load is carried on the lower surface of the expander.

In all cases the relatively hard material is smaller in diameter than the tube 7 to allow free movement, but large enough to restrict side motion, so the caster will not get cocked.

The construction of the various forms of the invention and the operations of some and the methods of their construction and application have been described above in conjunction with the description of each form.

The expanders are moulded into the various shapes and sizes desired so that they form an integral whole, combining the relatively soft and hard parts as selected and designed. The stem is held in place in the socket by this simple, inexpensive, and easily applied fitting.

From the foregoing it will be seen that we have provided simple, efficient and decidedly inexpensive means for carrying out the objects of the invention and for obtaining the advantages thereof.

Having described our inventon we claim:

1. In a device of the character described for use in combination with a member having a socket and a member having a stem for projection into the socket, an annular sleeve expander to fit over the stem between the stem and the socket walls, having a relatively hard body portion and a relatively soft portion, said soft portion arranged to resiliently engage the walls of the socket to hold the expander therein, and also to resiliently engage the stem to hold the stem in the expander.

2. In a device of the character described for use in combination with a member having a socket and a member having a stem to project into said socket, an annular sleeve expander to fit over the stem between the stem and the walls of the socket, having a relatively hard body portion and relatively soft projecting portions, said soft portions arranged for resiliently engaging the walls of the socket to hold the expander therein.

3. In a device of the character described for use in combination with a member having a socket and a member having a stem for projection into the socket, an annular sleeve expander to fit over the stem between the stem and the socket walls, having a relatively hard body portion and a relatively soft portion, said soft portion arranged to resiliently engage the walls of the socket to hold the expander therein, and said expander having a portion to project under the outer end of the socket to provide a resilient bearing for the same.

4. In a device of the character described for use in combination with a member having a socket and a member having a stem to project into said socket, an annular sleeve expander to fit over the stem between the stem and the walls of the socket, having a relatively hard body portion and relatively soft portions, said soft portions arranged for resiliently engaging the walls of the socket to hold the expander therein and also for resiliently engaging the stem to hold it in the expander and said expander having a portion to project under the outer end of the socket to provide a resilient bearing for the same.

5. In a device of the character described for use in combination with a member having a socket and a member having a stem for projecting into the socket, an annular sleeve expander for fitting over the stem between the stem and the walls of the socket, having a body portion of relatively hard material and a projecting portion of relatively soft material for engaging the walls of the socket for resiliently holding the expander in the socket and for resiliently holding the stem in the expander.

FRANK J. JARVIS.
CHARLES N. FRETTS.
NELSON L. JARVIS.